(12) United States Patent
Brattain

(10) Patent No.: US 12,193,430 B2
(45) Date of Patent: Jan. 14, 2025

(54) REUSABLE SNAKE TRAP ASSEMBLY

(71) Applicant: Aaron Seth Brattain, Bonita Springs, FL (US)

(72) Inventor: Aaron Seth Brattain, Bonita Springs, FL (US)

( * ) Notice: Subject to any disclaimer, the term of this patent is extended or adjusted under 35 U.S.C. 154(b) by 0 days.

(21) Appl. No.: 18/362,609

(22) Filed: Jul. 31, 2023

(65) Prior Publication Data

US 2024/0389573 A1 Nov. 28, 2024

Related U.S. Application Data

(63) Continuation-in-part of application No. 29/876,746, filed on May 26, 2023.

(51) Int. Cl.
*A01M 23/00* (2006.01)
*A01M 23/16* (2006.01)

(52) U.S. Cl.
CPC .......... *A01M 23/005* (2013.01); *A01M 23/16* (2013.01)

(58) Field of Classification Search
CPC .... A01M 23/005; A01M 23/16; A01M 23/02; A01M 23/08; A01M 23/14; A01M 1/14; A01M 1/16
USPC .......................... 43/114, 58, 60, 64, 65, 115
See application file for complete search history.

(56) References Cited

U.S. PATENT DOCUMENTS

| | | | | |
|---|---|---|---|---|
| 3,940,874 A * | 3/1976 | Katsuda | ................. | A01M 1/14 43/114 |
| 4,244,134 A * | 1/1981 | Otterson | ............. | A01M 23/005 43/58 |
| 4,253,264 A * | 3/1981 | Souza | .................. | A01M 23/14 43/73 |
| 4,395,842 A * | 8/1983 | Margulies | ............... | A01M 1/14 43/121 |
| 4,709,503 A * | 12/1987 | McQueen | ............... | A01M 1/14 43/121 |
| 5,251,397 A * | 10/1993 | Exum | ................... | A01M 1/145 43/115 |
| 5,771,628 A * | 6/1998 | Nobbs | .................. | A01M 1/2011 43/132.1 |
| 5,930,944 A * | 8/1999 | Knuppel | ............. | A01M 31/002 43/121 |
| 6,009,661 A * | 1/2000 | Lloyd | ................... | A01M 23/02 43/67 |
| 6,389,738 B1 * | 5/2002 | Denny | ................. | A01M 1/2011 43/58 |
| D470,562 S * | 2/2003 | Lafforthun | ................... | D22/119 |

(Continued)

*Primary Examiner* — Darren W Ark
*Assistant Examiner* — William L Gmoser

(57) ABSTRACT

A reusable snake trap assembly is an apparatus that can be used to effectively trap snakes and other unwanted critters for removal. The apparatus is designed to be continuously used to trap snakes and other critters in a safe and efficient manner. The apparatus includes a trap housing and an adhesive tray. The trap housing is a durable structure designed to attract snakes and critters by providing shelter from the weather. The trap housing is also designed to safely retain the adhesive tray to trap the snakes and critters that enter the trap housing. The adhesive tray is a disposable structure designed to trap the snakes and critters that enter the trap housing. This enables the apparatus to be used repeatedly by replacing the adhesive tray. The adhesive tray is also designed to be safely handled by the user while holding the trapped snakes and critters.

16 Claims, 13 Drawing Sheets

(56) References Cited

U.S. PATENT DOCUMENTS

| | | | | |
|---|---|---|---|---|
| 6,758,008 B1* | 7/2004 | Thebolt | ................ | A01M 23/24 |
| | | | | 43/81 |
| 7,856,752 B1* | 12/2010 | Eilersen | ................ | A01M 1/14 |
| | | | | 43/115 |
| 11,937,593 B1* | 3/2024 | Suteerawanit | .......... | A01M 1/14 |
| 2013/0333273 A1* | 12/2013 | Esculier | .............. | A01M 23/005 |
| | | | | 43/131 |
| 2017/0354139 A1* | 12/2017 | Vickery | ................ | A01M 23/16 |
| 2021/0169060 A1* | 6/2021 | Spangler | ................ | A01M 1/02 |
| 2021/0219539 A1* | 7/2021 | Tucker | ................ | A01M 23/16 |
| 2024/0114889 A1* | 4/2024 | Vickery | ................ | A01M 23/005 |
| 2024/0130353 A1* | 4/2024 | Bayne | ................ | A01M 23/005 |

* cited by examiner

REUSABLE SNAKE TRAP ASSEMBLY

The current application is a continuation-in-part (CIP) application of the U.S. design application Ser. No. 29/876, 746 filed on May 26, 2023.

FIELD OF THE INVENTION

The present invention relates generally to pest control and pet accessories. More specifically, the present invention provides a novel snake trap that is reusable, practical, and safe to use.

BACKGROUND OF THE INVENTION

Many people consider snakes as unwanted animals to have around. Non-venomous snakes are often found around residential buildings since these snakes are attracted to the insects and small mammals that inhabit the surroundings. While non-venomous pose little risk to people, most people prefer to remove the snakes to avoid any contact with them. To do so, various devices have been made available to help people trap and remove unwanted snakes. Different snake traps have been made available that allow the user to trap snakes either dead or alive. Some common snake traps used today are snake glue traps. In general, snake glue traps include a portable structure that retains a surface with adhesive that traps the snake once the snake has entered the structure. Unfortunately, most of the currently available snake traps are not effective at trapping the snakes and can be difficult to maintain. In addition, many of the currently available snake traps can be difficult to maintain after trapping a snake, especially if the user wants to remove the trapped snake alive. Thus, there is a need for a more efficient snake trap that can be consistently reused, is effective at trapping snakes, and can be easily maintained by the user.

An objective of the present invention is to provide a reusable snake trap assembly that is easy to use and deploy. The present invention is designed to be portable so that the user can easily set up the snake trap at the desired location. The present invention is also effective at attracting snakes since the present invention provides a shelter for the snake to rest within. Another objective of the present invention is to provide a reusable snake trap assembly that can be consistently reused for continuous use. The present invention includes a removable adhesive tray that can be replaced once a snake has been trapped. The removable adhesive tray can be designed to enable the removal of the snake without killing the snake. Additional features and benefits of the present invention are further discussed in the sections below.

SUMMARY OF THE INVENTION

The present invention provides a reusable snake trap assembly. The present invention is designed to effectively trap snakes and to facilitate the maintenance of the snake trap. To do so, the present invention preferably includes a trap housing with a housing lid and a housing receptacle. The housing lid and the housing receptacle form a shelter that snakes want to get in to escape the weather. Snakes and other critters can enter the housing receptacle through various holes on either side of the housing receptacle. The best places to set the present invention include, but are not limited to, around the perimeter of any structure and up against the wall. Snakes and other critters go into the trap housing for shelter from the weather which at that point they become trapped. Any unwanted critter that fits into the holes of the housing receptacle can become trapped. When entering the housing receptacle, the snake gets trapped on adhesive retained by an adhesive tray. The adhesive tray of the present invention is preferably a disposable component that can be replaced whenever a snake or other critters are trapped. To replace the adhesive tray, the housing lid is released from the housing receptacle to access the interior of the housing receptacle. Then, the user can reach into the housing receptacle to grab the adhesive tray to remove the adhesive tray from the housing receptacle. Once the user removes the used adhesive tray, the user can place a new adhesive tray inside the housing receptacle. The user can then engage the housing lid with the housing receptacle to close the trap housing until other snakes or critters are trapped. Furthermore, the present invention can be used inside or outside of a house or building in order to trap the target snakes.

DETAIL DESCRIPTIONS OF THE INVENTION

All illustrations of the drawings are for the purpose of describing selected versions of the present invention and are not intended to limit the scope of the present invention.

Figure 1:
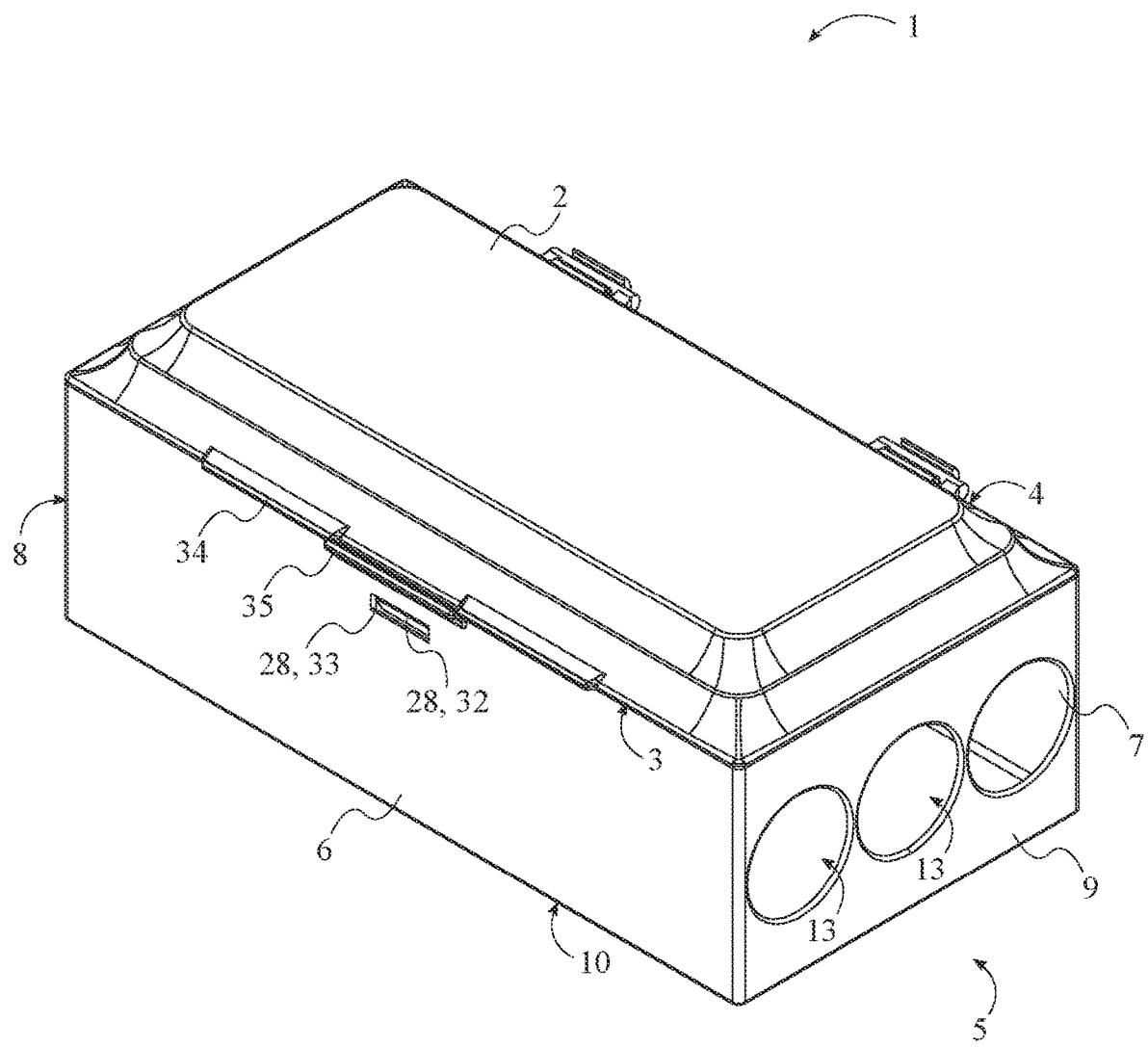
FIG. 1 is a top front perspective view of a trap housing of the present invention.
Figure 2:
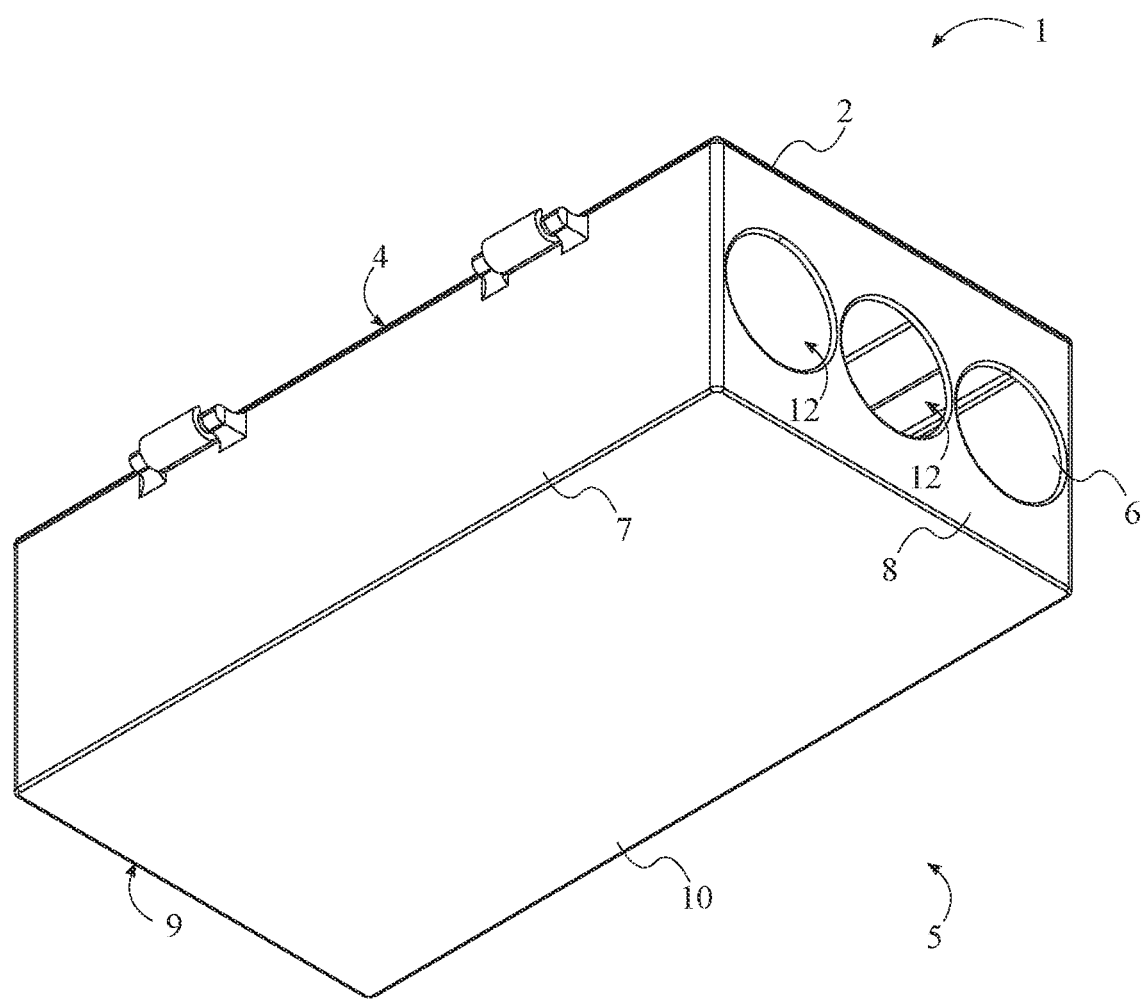
FIG. 2 is a bottom rear perspective view of the trap housing of the present invention.
Figure 3:
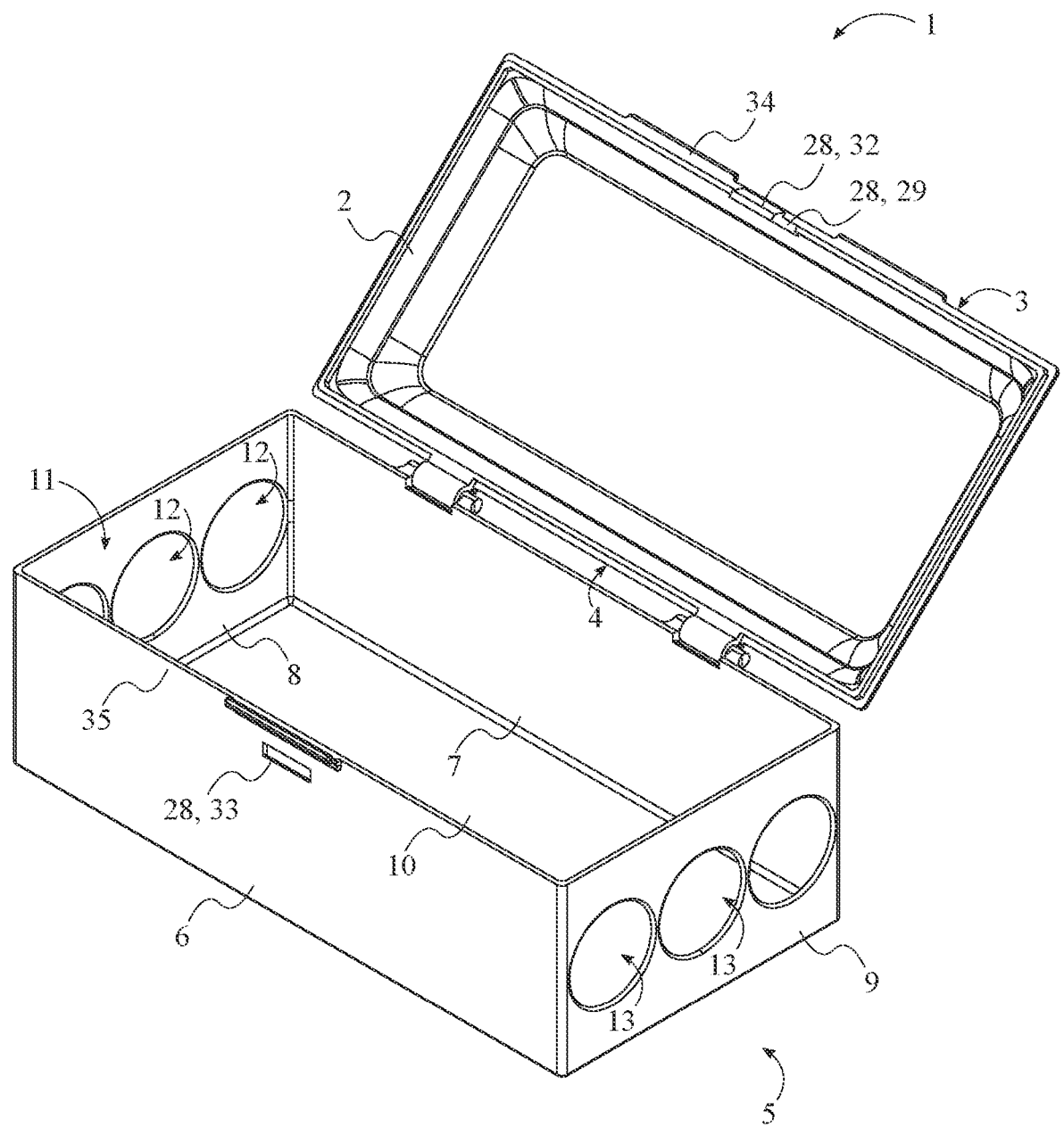
FIG. 3 is a top front perspective view of the trap housing of the present invention, wherein the trap housing is shown with a housing lid open.
Figure 4:
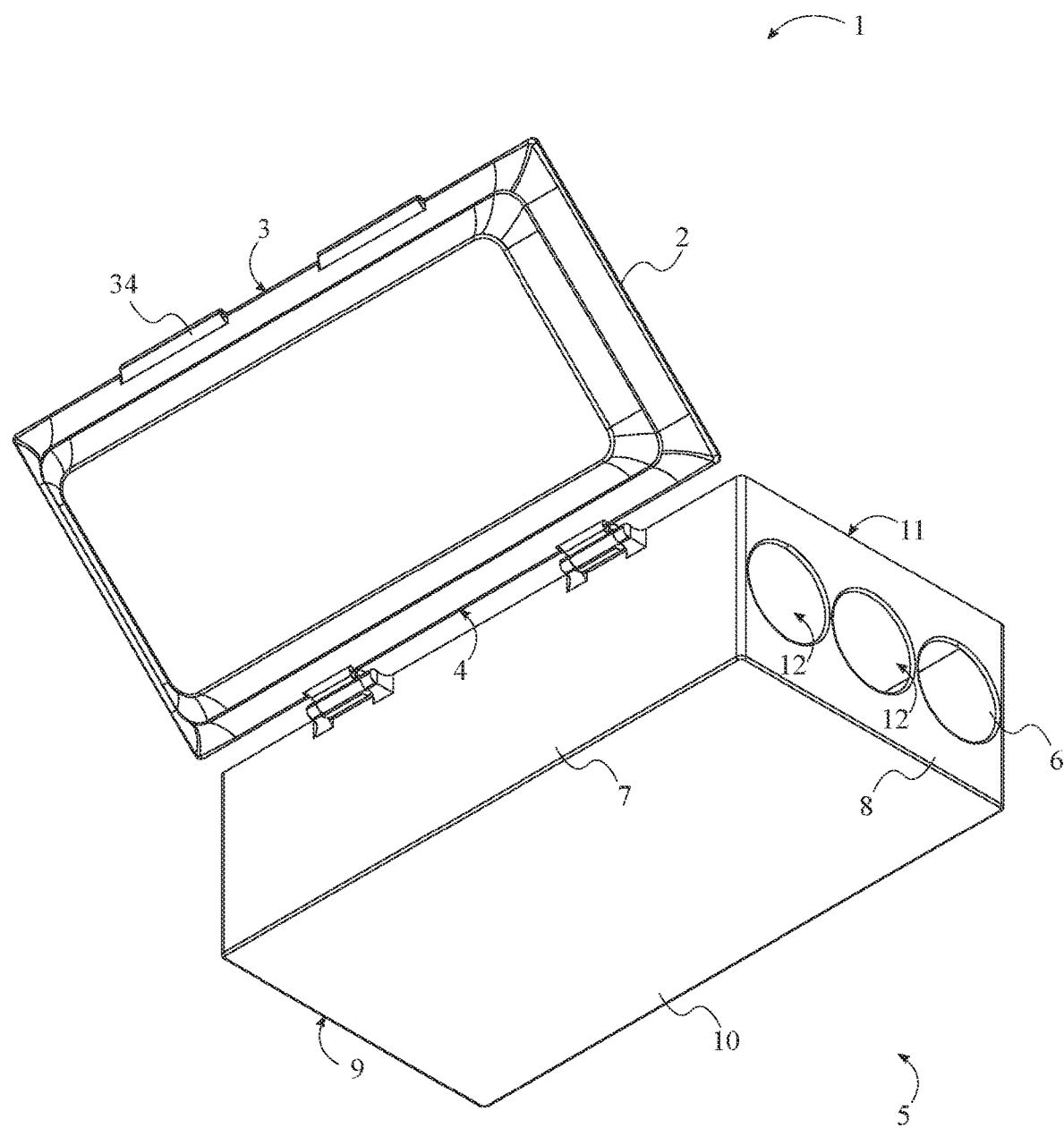
FIG. 4 is a bottom rear perspective view of the trap housing of the present invention, wherein the trap housing is shown with the housing lid open.
Figure 5:
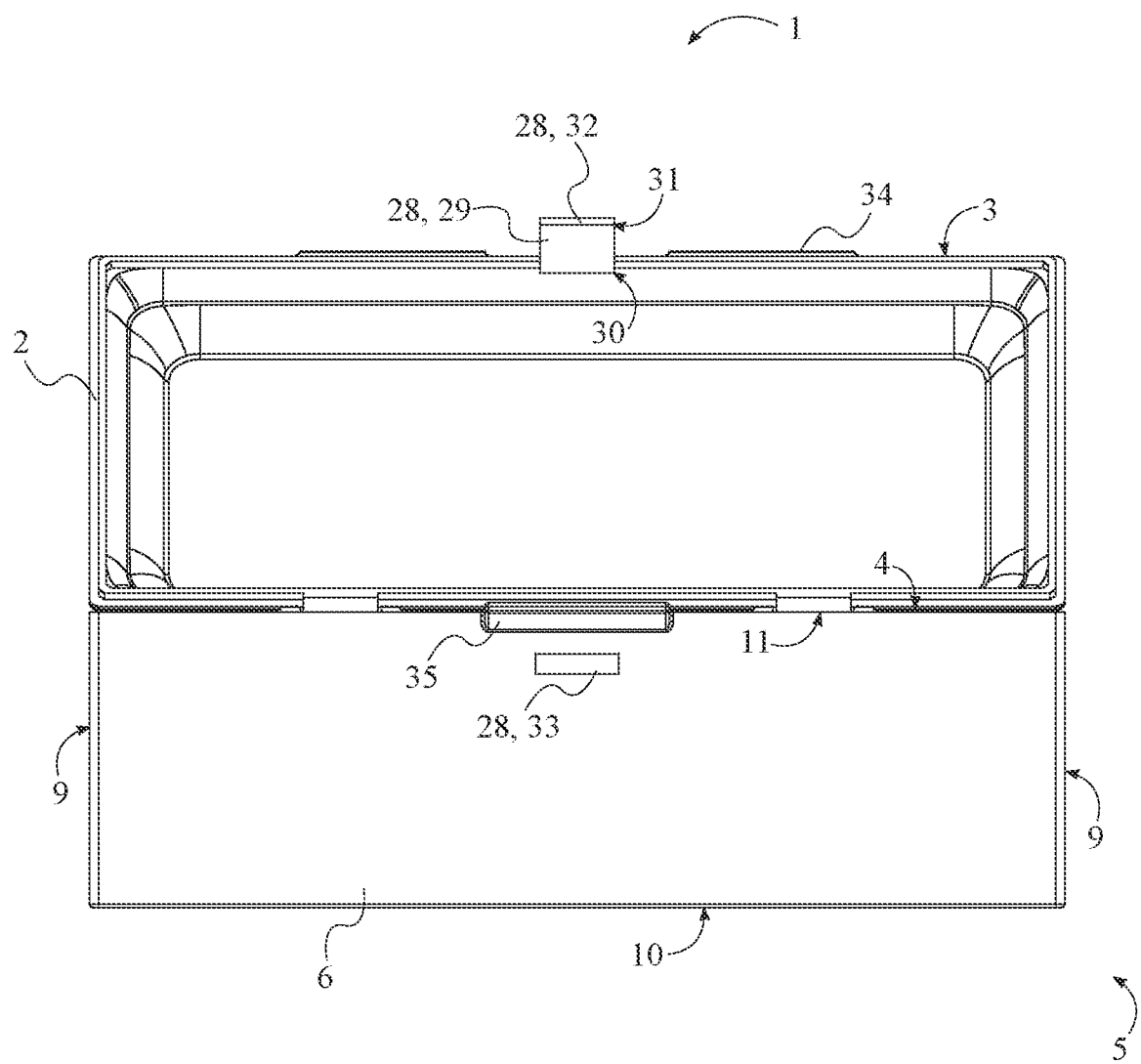
FIG. 5 is a front view of the trap housing of the present invention, wherein the trap housing is shown with the housing lid open.
Figure 6:
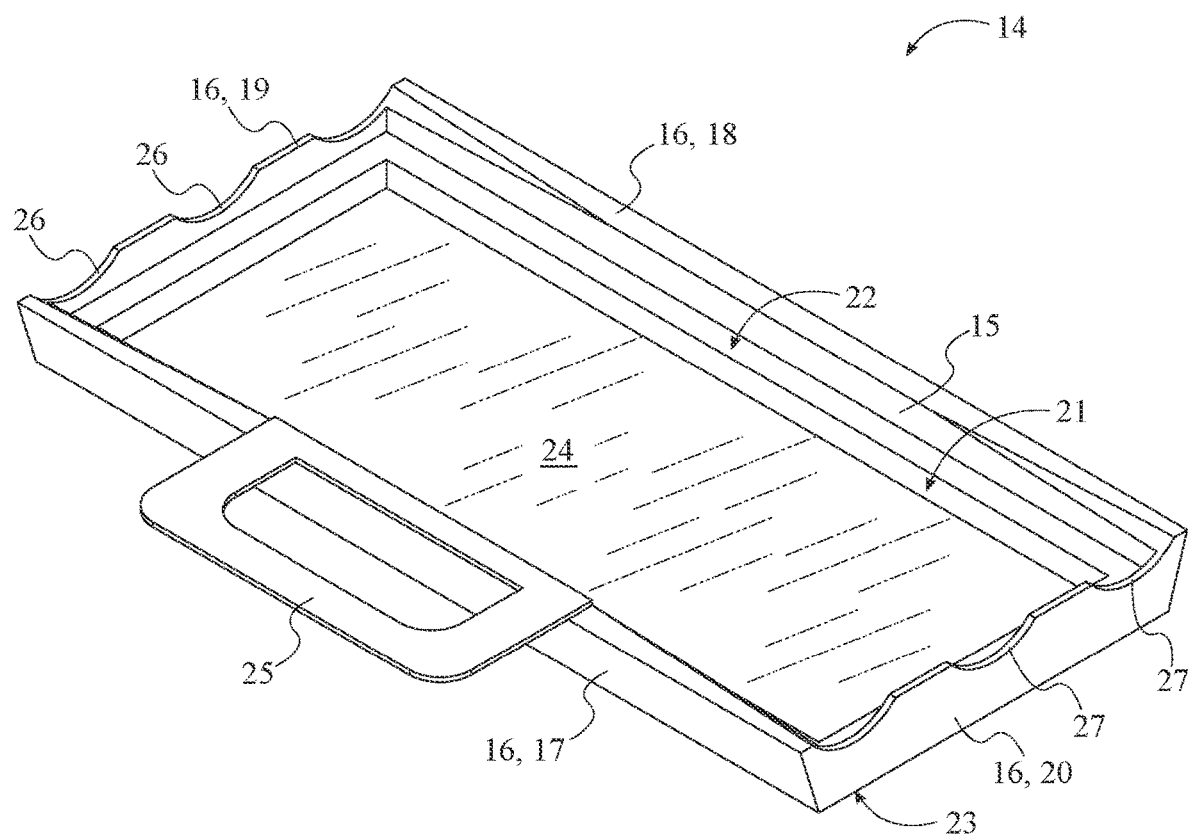
FIG. 6 is a top front perspective view of an adhesive tray of the present invention.
Figure 7:
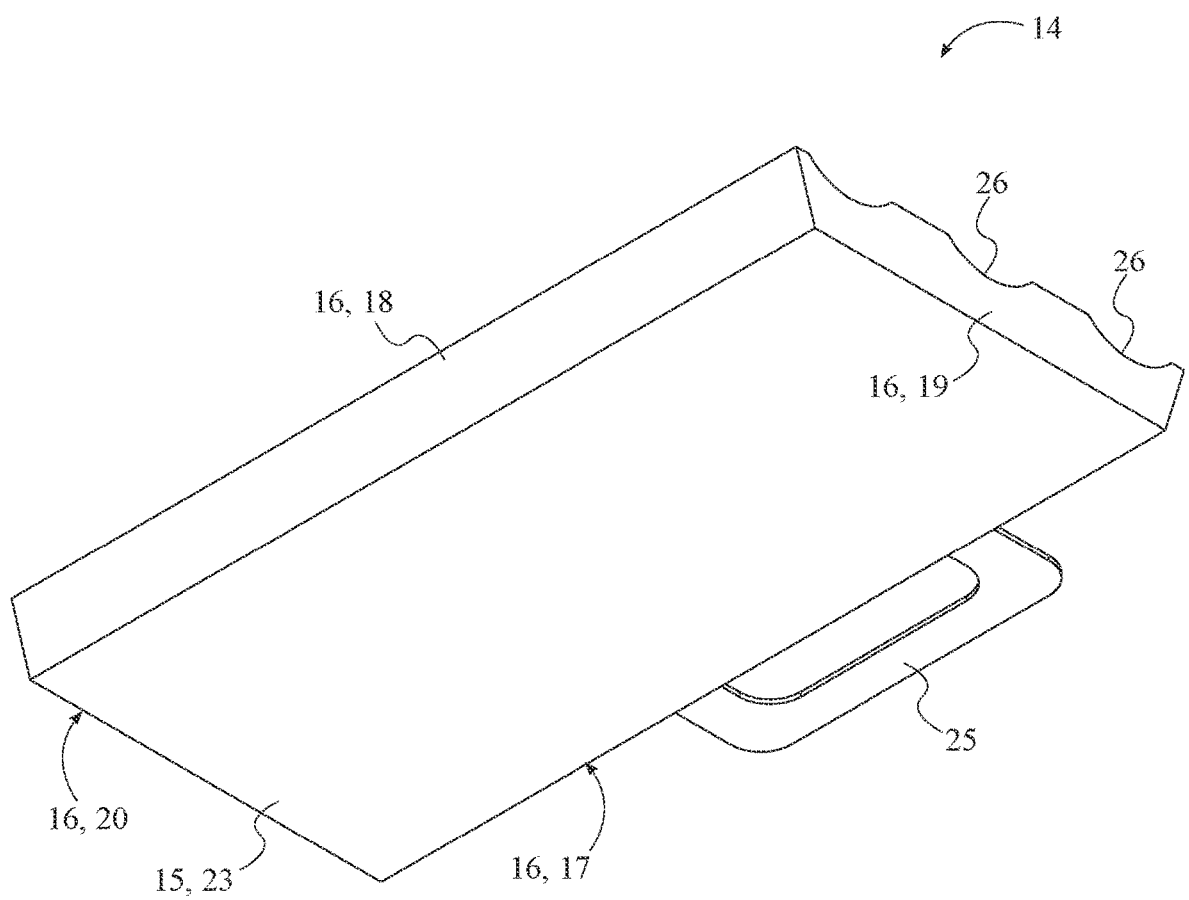
FIG. 7 is a bottom rear perspective view of the adhesive tray of the present invention.
Figure 8:
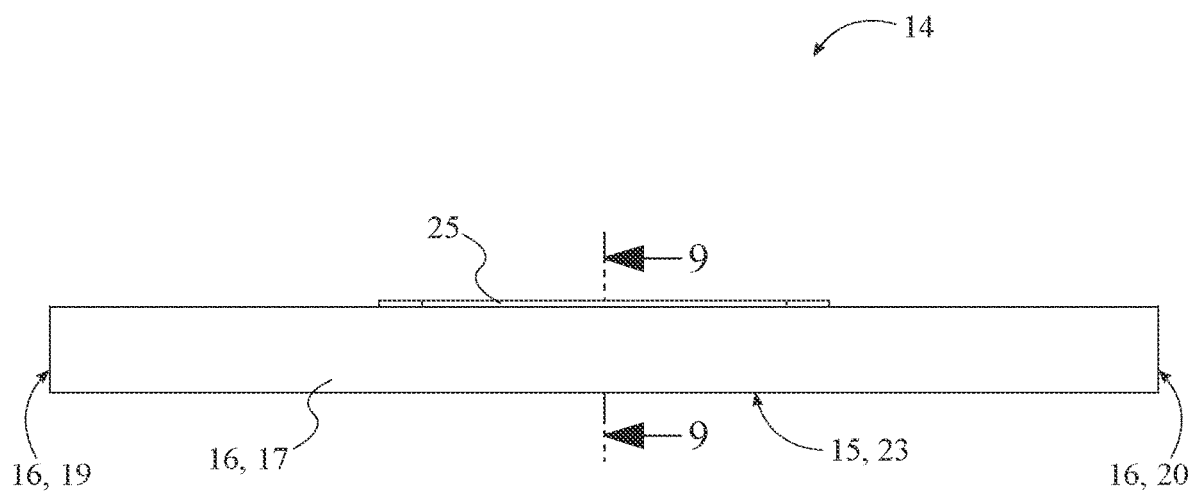
FIG. 8 is a front view of the adhesive tray of the present invention.
Figure 9:
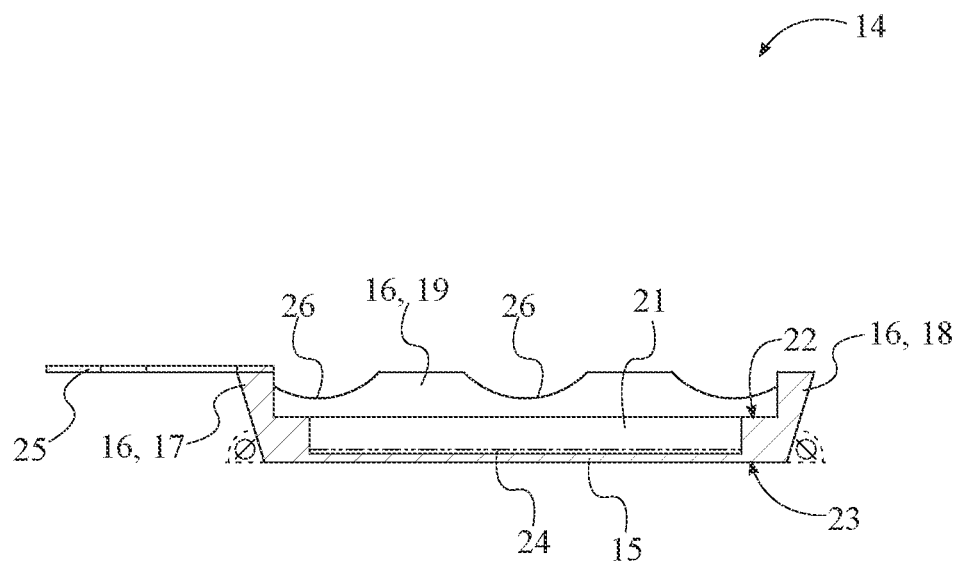
FIG. 9 is a vertical cross-sectional view of the adhesive tray of the present invention taken along line 9-9 in FIG. 8.
Figure 10:
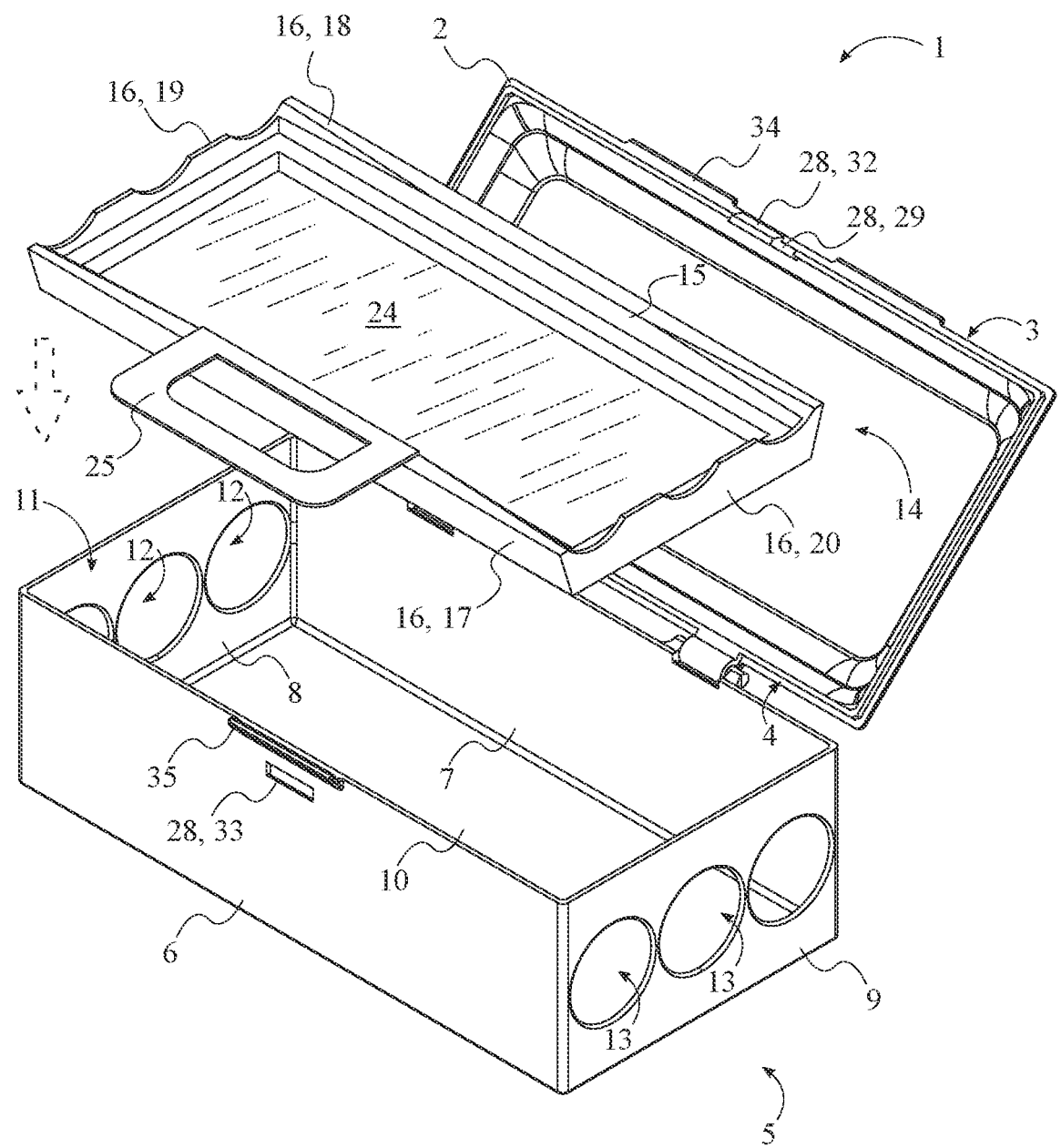
FIG. 10 is a top front perspective view of the present invention, wherein the adhesive tray is shown being inserted into the trap housing, and wherein the housing lid of trap housing is shown open.
Figure 11:
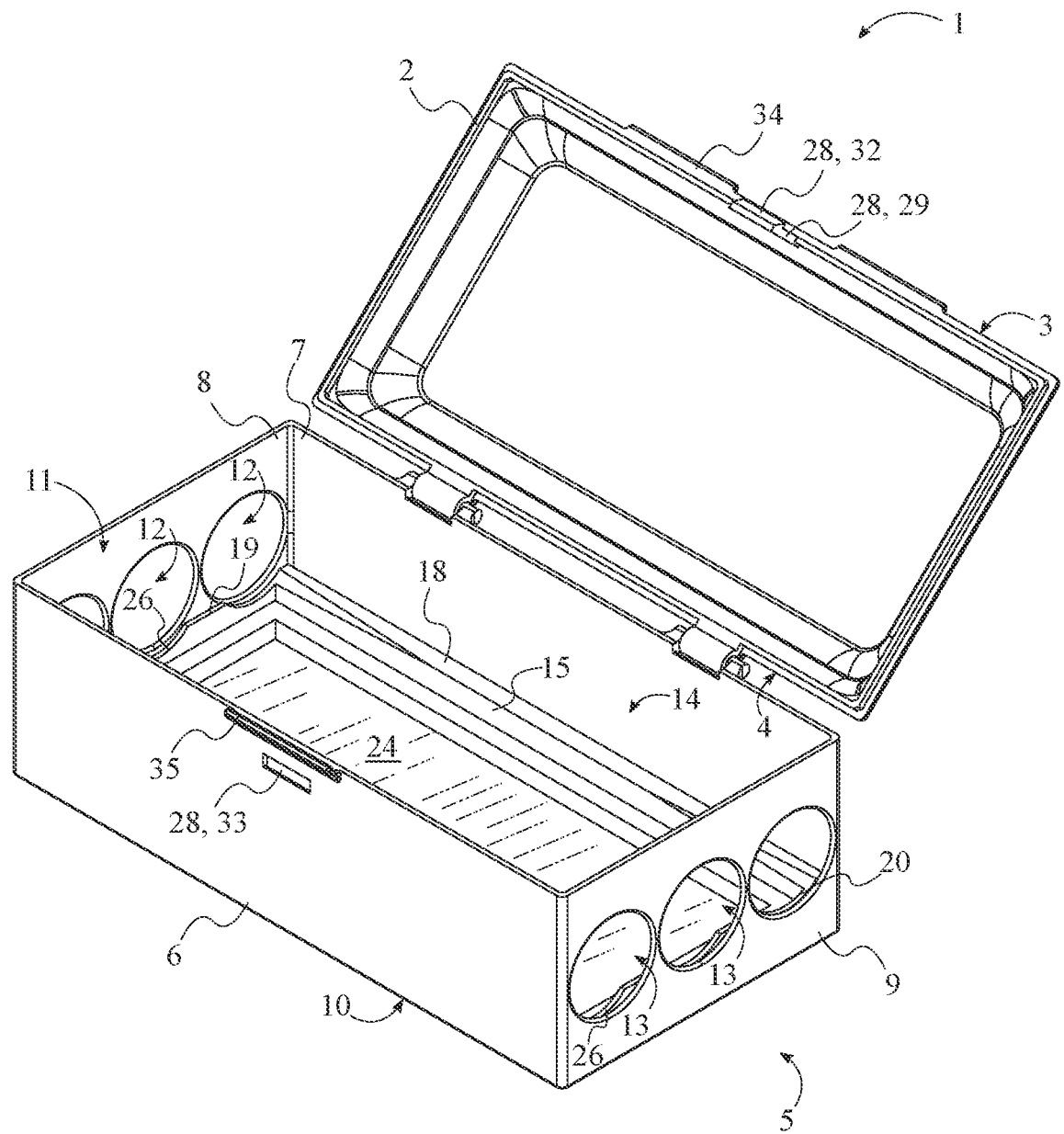
FIG. 11 is a top front perspective view of the present invention, wherein the adhesive tray is shown inserted into the trap housing, and wherein the housing lid of trap housing is shown open.
Figure 12:
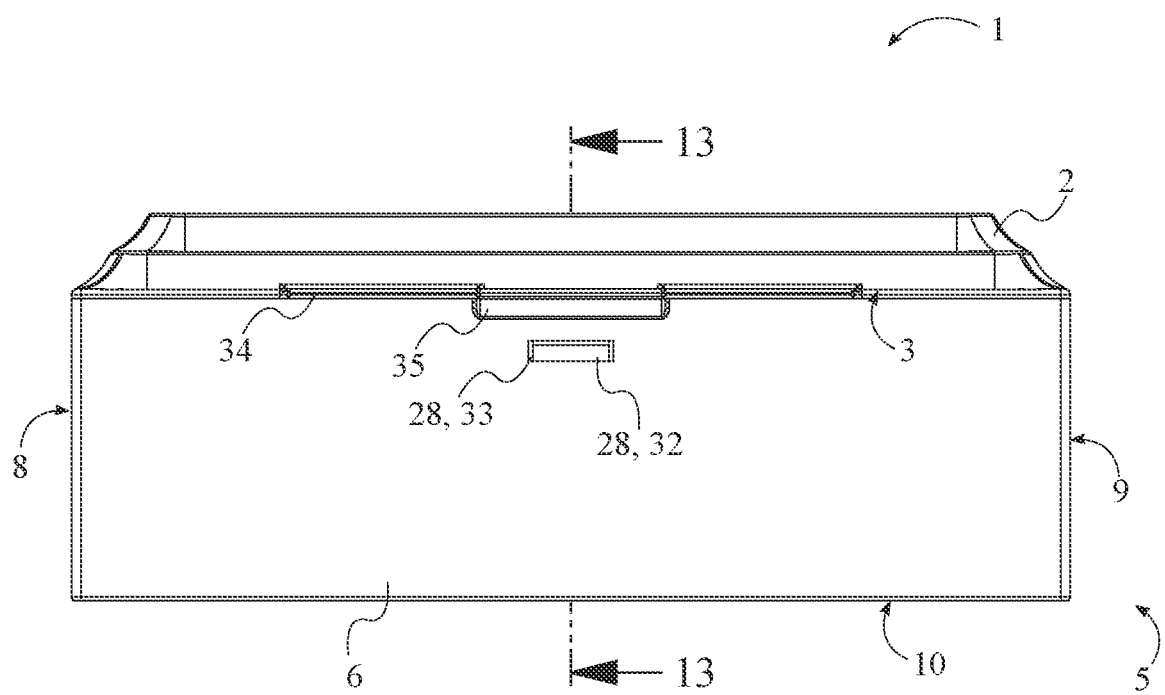
FIG. 12 is a front view of the present invention, wherein the adhesive tray is shown being inserted into the trap housing, and wherein the trap housing is shown closed.
Figure 13:
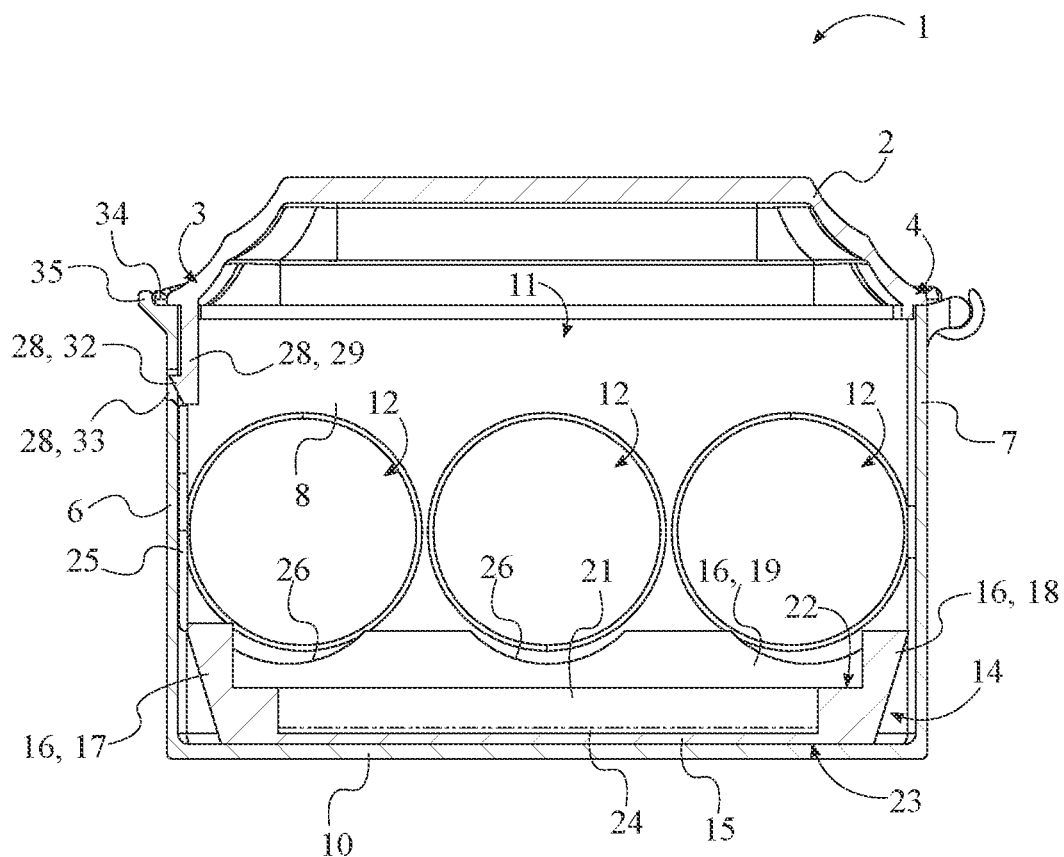
FIG. 13 is an enlarged vertical cross-sectional view of the present invention taken along line 13-13 in FIG. 12.

The present invention is a reusable snake trap assembly that can be used to effectively trap snakes and other unwanted critters for removal. The present invention is designed to be continuously used to trap snakes and other critters in a safe and efficient manner. As can be seen in FIGS. 1 through 13, the present invention comprises a trap housing 1 and an adhesive tray 14. The trap housing 1 is a durable structure designed to attract snakes and critters by providing shelter from the weather. The trap housing 1 is also designed to safely retain the adhesive tray 14 to trap the snakes and critters that enter the trap housing 1. The adhesive tray 14 is a disposable structure designed to trap the snakes and critters that enter the trap housing 1. The adhesive tray 14 is also designed to be safely handled by the user while holding the trapped snakes and critters.

The general configuration of the aforementioned components enables users to control the population of snakes and critters by facilitating the removal of these unwanted animals. The trap housing 1 is preferably a durable and portable structure large enough to trap the target snakes and critters. As can be seen in FIGS. 1 through 13, the trap housing 1 can be designed with an overall rectangular shape and is hollow to accommodate the adhesive tray 14. To do so, the trap housing 1 comprises a housing lid 2 and a housing receptacle 5. The housing receptacle 5 preferably corresponds to the main structure of the trap housing 1 that houses the adhesive tray 14. The housing receptacle 5 comprises a first lengthwise wall 6, a second lengthwise wall 7, a first widthwise wall 8, a second widthwise wall 9, a receptacle base 10, a receptacle opening 11, a plurality of first entrance holes 12, and a plurality of second entrance holes 13. The first lengthwise wall 6, the second lengthwise wall 7, the first widthwise wall 8, and the second widthwise wall 9 correspond to the lateral walls of the housing receptacle 5. The receptacle base 10 preferably corresponds to the base of the housing receptacle 5, while the receptacle opening 11 corresponds to the main opening of the housing receptacle 5. The plurality of first entrance holes 12 and the plurality of second entrance holes 13 correspond to the secondary openings through which snakes and critters can enter the housing receptacle 5. The housing lid 2 serves to seal the housing receptacle 5 to prevent accidental access to the adhesive tray 14 while the trap housing 1 is placed on the target location to trap the unwanted snakes and critters. Further, the adhesive tray 14 comprises a tray body 15, a first tray face 22, a second tray face 23, a quantity of adhesive 24, and a tray handle 25. The tray body 15 corresponds to the main structure of the adhesive tray 14. The tray body 15 is preferably an overall rectangular structure large enough to fit within the trap housing 1. The first tray face 22 and the second tray face 23 preferably correspond to the largest opposing surfaces of the adhesive tray 14. The quantity of adhesive 24 serves to trap the snakes and critters. Further, the tray handle 25 provides a safe area from which the user can hold onto the adhesive tray 14.

In the preferred embodiment, the present invention can be assembled as follows. As can be seen in FIGS. 1 through 13, the first lengthwise wall 6, the second lengthwise wall 7, the first widthwise wall 8, and the second widthwise wall 9 are perimetrically connected around the receptacle base 10 to form the rectangular structure of the housing receptacle 5. Further, the receptacle opening 11 is positioned opposite to the receptacle base 10 about the housing receptacle 5 to leave a holding space where the adhesive tray 14 is retained. In addition, the plurality of first entrance holes 12 traverses through the first widthwise wall 8 to provide lateral openings through which the snakes and critters can enter the housing receptacle 5. Likewise, the plurality of second entrance holes 13 traverses through the second widthwise wall 9 to provide additional lateral openings through which the snakes and critters can enter the housing receptacle 5. To secure the housing lid 2 to the housing receptacle 5, the housing lid 2 is hingedly connected to the second lengthwise wall 7. The housing lid 2 is also situated across the receptacle opening 11 to enclose the housing receptacle 5 when the housing lid 2 is positioned over the receptacle opening 11. Further, the first tray face 22 is positioned opposite to the second tray face 23 about the tray body 15 due to the overall rectangular shape of the tray body 15. The quantity of adhesive 24 is distributed across the first tray face 22 to ensure that the snake or critters are trapped on the quantity of adhesive 24. Further, the tray handle 25 is perimetrically positioned to the tray body 15 so that the tray handle 25 does not obstruct the quantity of adhesive 24. The tray handle 25 is also hingedly connected to the tray body 15 to secure the tray handle 25 to the tray body 15. Then, to complete the assembly, the adhesive tray 14 is positioned within the housing receptacle 5. When the adhesive tray 14 is placed inside the housing receptacle 5, the tray handle 25 is bent upwards so that the tray handle 25 can be accessible for safe removal of the adhesive tray 14 from the housing receptacle 5. That way, when a snake or critters are trapped on the quantity of adhesive 24, the user can reach into the housing receptacle 5 and grab onto the tray handle 25 so that the user does not touch the trapped snake or critters.

The entrance holes are designed to facilitate the entrance of snakes and critters into the housing receptacle 5. As can be seen in FIGS. 1 through 5, the plurality of first entrance holes 12 can be linearly positioned across the first widthwise wall 8 to provide as many options as possible for snakes and critters to enter the housing receptacle 5 through the first widthwise wall 8. In addition, the plurality of first entrance holes 12 can be positioned equidistant between the receptacle opening 11 and the receptacle base 10. This way, the snakes and critters can easily enter the housing receptacle 5. Similarly, the plurality of second entrance holes 13 can be linearly positioned across the second widthwise wall 9 to provide as many options as possible for snakes and critters to enter the housing receptacle 5 through the second widthwise wall 9. Further, the plurality of second entrance holes 13 can be positioned equidistant between the receptacle opening 11 and the receptacle base 10. This way, the snakes and critters can easily enter the housing receptacle 5. In the preferred embodiment, the entrance holes are circular holes with a diameter smaller than the thickness of the housing receptacle 5. In other embodiments, the entrance holes can be arranged differently, have different shapes and sizes, and additional holes can be provided.

As previously discussed, the adhesive tray 14 is designed to safely trap the snakes and critters. As can be seen in FIGS. 6 through 9, the tray body 15 may comprise a tray rim 16 that forms a border around the tray body 15. This forces snakes and critters to fall on the quantity of adhesive 24. In addition, the tray rim 16 comprises a first lengthwise portion 17, a second lengthwise portion 18, a first widthwise portion 19, and a second widthwise portion 20. The first lengthwise portion 17, the second lengthwise portion 18, the first widthwise portion 19, and the second widthwise portion 20 correspond to the lateral portions of the tray rim 16 to match the overall rectangular structure of the tray body 15. To secure the tray rim 16 to the tray body 15, the tray rim 16 is perimetrically connected to the receptacle base 10. In addition, when the adhesive tray 14 is placed inside the housing receptacle 5, the first lengthwise portion 17 is positioned along the first lengthwise wall 6, the second lengthwise portion 18 is positioned along the second lengthwise wall 7, the first widthwise portion 19 is positioned along the first widthwise wall 8, and the second widthwise portion 20 is positioned along the second widthwise wall 9. However, due to the matching design of the adhesive tray 14 with the housing receptacle 5, the user can place the adhesive tray 14 inside the housing receptacle 5 the opposite way. Furthermore, the tray handle 25 is hingedly connected to the first lengthwise portion 17 to ensure that the tray handle 25 is offset the quantity of adhesive 24 and to enable the tray handle 25 to bend when the adhesive tray 14 is placed within the housing receptacle 5.

In some embodiments, the tray rim 16 can be thin enough to not block the entrance holes when the adhesive tray 14 is positioned within the housing receptacle 5. In other embodiments, the tray rim 16 can be designed to match the design of the entrance holes. As can be seen in FIGS. 6 through 13, the present invention may further comprise a plurality of first arc-shaped cutouts 26. The plurality of first arc-shaped cutouts 26 enables the tray rim 16 to be wider without blocking the plurality of first entrance holes 12. To do so, the plurality of first arc-shaped cutouts 26 traverses through the first widthwise portion 19 to leave space for the plurality of first entrance holes 12. In addition, the plurality of first arc-shaped cutouts 26 is positioned opposite to the receptacle base 10 across the first widthwise portion 19 so that the plurality of first arc-shaped cutouts 26 match the location of the plurality of first entrance holes 12. Further, each of the plurality of first arc-shaped cutouts 26 is positioned concentric with a corresponding hole from the plurality of first entrance holes 12. This way, the plurality of first arc-shaped cutouts 26 prevents the tray rim 16 from blocking the plurality of first entrance holes 12 when the adhesive tray 14 is placed inside the housing receptacle 5. In other embodiments, the first arc-shaped cutouts may include a different shape, arrangement, or size.

In a similar manner, the present invention may further comprise a plurality of second arc-shaped cutouts 27. As can be seen in FIGS. 6 through 13, the plurality of second arc-shaped cutouts 27 enables the tray rim 16 to be wider without blocking the plurality of second entrance holes 13. To do so, the plurality of second arc-shaped cutouts 27 traverses through the second widthwise portion 20 to leave space for the plurality of second entrance holes 13. In addition, the plurality of second arc-shaped cutouts 27 is positioned opposite to the receptacle base 10 across the second widthwise portion 20 so that the plurality of second arc-shaped cutouts 27 match the location of the plurality of second entrance holes 13. Further, each of the plurality of second arc-shaped cutouts 27 is positioned concentric with a corresponding hole from the plurality of second entrance holes 13. This way, the plurality of second arc-shaped cutouts 27 prevents the tray rim 16 from blocking the plurality of second entrance holes 13 when the adhesive tray 14 is placed inside the housing receptacle 5. In other embodiments, the second arc-shaped cutouts may include a different shape.

In some embodiments, the adhesive tray 14 is designed to be easily removed from the housing receptacle 5 by preventing the adhesive tray 14 from getting stuck inside the housing receptacle 5. As can be seen in FIGS. 6 through 13, the first lengthwise portion 17 and the second lengthwise portion 18 are positioned opposite to each other across the tray body 15 due to the overall rectangular shape of the tray body 15. In addition, the first lengthwise portion 17 and the second lengthwise portion 18 may be positioned at obtuse angle with the first tray face 22 so that when the user is removing the adhesive tray 14 from the housing receptacle 5, the adhesive tray 14 is not stuck inside the housing receptacle 5. Similarly, the first widthwise portion 19 and the second widthwise portion 20 are positioned opposite to each other across the tray body 15 due to the rectangular shape of the tray body 15. However, the first widthwise portion 19 and the second widthwise portion 20 may be positioned perpendicular to the first tray face 22. This way, the adhesive tray 14 can be easily pulled out of the housing receptacle 5 by the user without risk of the adhesive tray 14 getting stuck inside the housing receptacle 5 while being removed.

As previously discussed, the adhesive tray 14 is designed to be safely handled by the user without risk of the user accidentally touching the quantity of adhesive 24. To further ensure that the quantity of adhesive 24 is kept away from the user's hand, the tray body 15 may further comprise a face recession 21. As can be seen in FIGS. 6 through 9, the face recession 21 provides a space to contain the quantity of adhesive 24 to further separate the quantity of adhesive 24 from the user's hand when the user grabs the tray handle 25. Accordingly, the face recession 21 traverses into the tray body 15 from the first tray face 22 to form a recession deep enough to hold the quantity of adhesive 24. In addition, the face recession 21 is centrally positioned on the first tray face 22 to position the quantity of adhesive 24 on the center of the first tray face 22. Furthermore, the quantity of adhesive 24 is retained within the face recession 21. Thus, the snakes and critters can easily fall on the quantity of adhesive 24 after entering the housing receptacle 5. In addition, the user's hand is further protected from touching the quantity of adhesive 24 when retrieving or placing the adhesive tray 14.

The trap housing 1 is designed to be positioned in various locations, either indoors or outdoors. This can leave the present invention exposed to children or other unauthorized users. To prevent the unauthorized access into the trap housing 1, the present invention may further comprise a locking mechanism 28 that keeps the housing lid 2 attached to the housing receptacle 5 when the present invention is placed to trap snakes or critters. As can be seen in FIGS. 1 through 5 and 10 through 13, the locking mechanism 28 is designed to keep the housing lid 2 closed while enabling the easy release of the housing lid 2 from the housing receptacle 5. Accordingly, the locking mechanism 28 comprises a flexible shaft 29, a press hook 32, and a hook receiver 33. The flexible shaft 29 corresponds to the portion of the locking mechanism 28 that facilitates the engagement of the press hook 32 with the hook receiver 33. The press hook 32 and the hook receiver 33 correspond to the locking components that keep the housing lid 2 closed. Further, the housing lid 2 comprises a first lid edge 3 and a second lid edge 4 that preferably correspond to the longest edges of the housing lid 2. In addition, the flexible shaft 29 comprises a fixed shaft end 30 and a free shaft end 31 corresponding to the terminal ends of the flexible shaft 29.

In the preferred embodiment, the locking mechanism 28 is arranged as follows. As can be seen in FIGS. 1 through 5 and 10 through 13, the first lid edge 3 and the second lid edge 4 are positioned opposite to each other across the housing lid 2 due to the overall rectangular shape of the housing lid 2. Further, the fixed shaft end 30 is connected onto the housing lid 2, adjacent to the first lid edge 3, to secure the flexible shaft 29 to the housing lid 2. On the other hand, the press hook 32 is connected onto the free shaft end 31 to secure the press hook 32 to the flexible shaft 29. Further, the second lid edge 4 is hingedly connected to the second lengthwise wall 7 to secure the housing lid 2 to the housing receptacle 5. In addition, the hook receiver 33 is integrated into the first lengthwise wall 6, adjacent to the receptacle opening 11, to receive the press hook 32 when the housing lid 2 is closed. To lock the trap housing 1, the housing lid 2 is positioned over the receptacle opening 11 while pressing the press hook 32 against the interior of the first lengthwise wall 6. Due to the flexibility of the flexible shaft 29, the press shaft moves along the first lengthwise wall 6 until the press hook 32 is engaged with the hook receiver 33. Then, to release the locking mechanism 28, the user can push the press hook 32 out of the hook receiver 33 while opening the housing lid 2. In other embodiments, the locking mechanism 28 can include different mechanisms that further prevent access into the housing receptacle 5.

To facilitate the operation of the locking mechanism 28, the present invention can include means to safely engage and disengage the locking mechanism 28. As can be seen in FIGS. 1 through 5 and 10 through 13, the present invention may further comprise at least one lid tab 34 and at least one receptacle tab 35. The at least one lid tab 34 and the at least one receptacle tab 35 enable the user to easily operate the locking mechanism 28. Accordingly, the at least one lid tab 34 is peripherally connected to the housing lid 2 to secure the at least one lid tab 34 to the housing lid 2. On the other hand, the at least one receptacle tab 35 is peripherally connected to the housing receptacle 5, adjacent to the receptacle opening 11, to secure the at least one receptacle tab 35 to the housing receptacle 5. In addition, when the housing lid 2 is closed, the at least one lid tab 34 and the at least one receptacle tab 35 are positioned adjacent to each other. This way, when the user is engaging the locking mechanism 28, the user can push the at least one lid tab 34 towards the at least one receptacle tab 35 to engage the press hook 32 with the hook receiver 33. Alternatively, to release the locking mechanism 28, the user can pull the at least one lid tab 34 away from the at least one receptacle tab 35 to release the press hook 32 from the hook receiver 33. In other embodiments, different features can be utilized to facilitate the operation of the locking mechanism 28.

Although the invention has been explained in relation to its preferred embodiment, it is to be understood that many other possible modifications and variations can be made without departing from the spirit and scope of the invention.

What is claimed is:

1. A reusable snake trap assembly comprising:
    a trap housing;
    an adhesive tray;
    a plurality of first arc-shaped cutouts;
    the trap housing comprising a housing lid and a housing receptacle;
    the adhesive tray comprising a tray body, a first tray face, a second tray face, a quantity of adhesive, and a tray handle;
    the housing receptacle comprising a first lengthwise wall, a second lengthwise wall, a first widthwise wall, a second widthwise wall, a receptacle base, a receptacle opening, a plurality of first entrance holes, and a plurality of second entrance holes;
    the tray body comprising a tray rim;
    the tray rim comprising a first lengthwise portion, a second lengthwise portion, a first widthwise portion, and a second widthwise portion;
    the first lengthwise wall, the second lengthwise wall, the first widthwise wall, and the second widthwise wall being perimetrically connected around the receptacle base;
    the receptacle opening being positioned opposite to the receptacle base about the housing receptacle;
    the plurality of first entrance holes traversing through the first widthwise wall;
    the plurality of second entrance holes traversing through the second widthwise wall;
    the housing lid being hingedly connected to the second lengthwise wall;
    the housing lid being situated across the receptacle opening;
    the first tray face being positioned opposite to the second tray face about the tray body;
    the quantity of adhesive being distributed across the first tray face;
    the tray handle being perimetrically positioned to the tray body;
    the tray handle being hingedly connected to the tray body;
    the adhesive tray being positioned within the housing receptacle;
    the tray rim being perimetrically connected to the receptacle base;
    the first lengthwise portion being positioned along the first lengthwise wall;
    the second lengthwise portion being positioned along the second lengthwise wall;
    the first widthwise portion being positioned along the first widthwise wall;
    the second widthwise portion being positioned along the second widthwise wall;
    the tray handle being hingedly connected to the first lengthwise portion;
    the plurality of first arc-shaped cutouts traversing through the first widthwise portion;
    the plurality of first arc-shaped cutouts being positioned opposite to the receptacle base across the first widthwise portion; and
    each of the plurality of first arc-shaped cutouts being positioned concentric with a corresponding hole from the plurality of first entrance holes.

2. The reusable snake trap assembly as claimed in claim 1 comprising:
    the plurality of first entrance holes being linearly positioned across the first widthwise wall; and
    the plurality of first entrance holes being positioned equidistant between the receptacle opening and the receptacle base.

3. The reusable snake trap assembly as claimed in claim 1 comprising:
    the plurality of second entrance holes being linearly positioned across the second widthwise wall; and
    the plurality of second entrance holes being positioned equidistant between the receptacle opening and the receptacle base.

4. The reusable snake trap assembly as claimed in claim 1 comprising:
    a plurality of second arc-shaped cutouts;
    the plurality of second arc-shaped cutouts traversing through the second widthwise portion;
    the plurality of second arc-shaped cutouts being positioned opposite to the receptacle base across the second widthwise portion; and
    each of the plurality of second arc-shaped cutouts being positioned concentric with a corresponding hole from the plurality of second entrance holes.

5. The reusable snake trap assembly as claimed in claim 1 comprising:
    the first lengthwise portion and the second lengthwise portion being positioned opposite to each other across the tray body; and
    the first lengthwise portion and the second lengthwise portion being positioned at obtuse angle with the first tray face.

6. The reusable snake trap assembly as claimed in claim 1 comprising:
the first widthwise portion and the second widthwise portion being positioned opposite to each other across the tray body; and
the first widthwise portion and the second widthwise portion being positioned perpendicular to the first tray face.

7. The reusable snake trap assembly as claimed in claim 1 comprising:
the tray body further comprising a face recession;
the face recession traversing into the tray body from the first tray face;
the face recession being centrally positioned on the first tray face; and
the quantity of adhesive being retained within the face recession.

8. The reusable snake trap assembly as claimed in claim 1 comprising:
a locking mechanism;
the locking mechanism comprising a flexible shaft, a press hook, and a hook receiver;
the housing lid comprising a first lid edge and a second lid edge;
the flexible shaft comprising a fixed shaft end and a free shaft end;
the first lid edge and the second lid edge being positioned opposite to each other across the housing lid;
the fixed shaft end being connected onto the housing lid, adjacent to the first lid edge;
the press hook being connected onto the free shaft end;
the second lid edge being hingedly connected to the second lengthwise wall;
the hook receiver being integrated into the first lengthwise wall, adjacent to the receptacle opening; and
the press hook being engaged with the hook receiver.

9. The reusable snake trap assembly as claimed in claim 1 comprising:
at least one lid tab;
at least one receptacle tab;
the at least one lid tab being peripherally connected to the housing lid;
the at least one receptacle tab being peripherally connected to the housing receptacle, adjacent to the receptacle opening; and
the at least one lid tab and the at least one receptacle tab being positioned adjacent to each other.

10. A reusable snake trap assembly comprising:
a trap housing;
an adhesive tray;
a plurality of first arc-shaped cutouts;
the trap housing comprising a housing lid and a housing receptacle;
the adhesive tray comprising a tray body, a first tray face, a second tray face, a quantity of adhesive, and a tray handle;
the housing receptacle comprising a first lengthwise wall, a second lengthwise wall, a first widthwise wall, a second widthwise wall, a receptacle base, a receptacle opening, a plurality of first entrance holes, and a plurality of second entrance holes;
the tray body comprising a tray rim;
the tray rim comprising a first lengthwise portion, a second lengthwise portion, a first widthwise portion, and a second widthwise portion;
the first lengthwise wall, the second lengthwise wall, the first widthwise wall, and the second widthwise wall being perimetrically connected around the receptacle base;
the receptacle opening being positioned opposite to the body base about the receptacle receptacle;
the plurality of first entrance holes being linearly positioned across the first widthwise wall;
the plurality of first entrance holes being positioned equidistant between the receptacle opening and the receptacle base;
the plurality of first entrance holes traversing through the first widthwise wall;
the plurality of second entrance holes being linearly positioned across the second widthwise wall;
the plurality of second entrance holes being positioned equidistant between the receptacle opening and the receptacle base;
the plurality of second entrance holes traversing through the second widthwise wall;
the housing lid being hingedly connected to the second lengthwise wall;
the housing lid being situated across the receptacle opening;
the first tray face being positioned opposite to the second tray face about the tray body;
the quantity of adhesive being distributed across the first tray face;
the tray handle being perimetrically positioned to the tray body;
the tray handle being hingedly connected to the tray body; and
the adhesive tray being positioned within the housing receptacle;
the tray rim being perimetrically connected to the receptacle base;
the first lengthwise portion being positioned along the first lengthwise wall;
the second lengthwise portion being positioned along the second lengthwise wall;
the first widthwise portion being positioned along the first widthwise wall;
the second widthwise portion being positioned along the second widthwise wall;
the tray handle being hingedly connected to the first lengthwise portion;
the plurality of first arc-shaped cutouts traversing through the first widthwise portion;
the plurality of first arc-shaped cutouts being positioned opposite to the receptacle base across the first widthwise portion; and
each of the plurality of first arc-shaped cutouts being positioned concentric with a corresponding hole from the plurality of first entrance holes.

11. The reusable snake trap assembly as claimed in claim 10 comprising:
a plurality of second arc-shaped cutouts;
the plurality of second arc-shaped cutouts traversing through the second widthwise portion;
the plurality of second arc-shaped cutouts being positioned opposite to the receptacle base across the second widthwise portion; and each of the plurality of second arc-shaped cutouts being positioned concentric with a corresponding hole from the plurality of second entrance holes.

12. The reusable snake trap assembly as claimed in claim 10 comprising:
   the first lengthwise portion and the second lengthwise portion being positioned opposite to each other across the tray body; and
   the first lengthwise portion and the second lengthwise portion being positioned at obtuse angle with the first tray face.

13. The reusable snake trap assembly as claimed in claim 10 comprising:
   the first widthwise portion and the second widthwise portion being positioned opposite to each other across the tray body; and
   the first widthwise portion and the second widthwise portion being positioned perpendicular to the first tray face.

14. The reusable snake trap assembly as claimed in claim 10 comprising:
   the tray body further comprising a face recession;
   the face recession traversing into the tray body from the first tray face;
   the face recession being centrally positioned on the first tray face; and
   the quantity of adhesive being retained within the face recession.

15. The reusable snake trap assembly as claimed in claim 10 comprising:
   a locking mechanism;
   the locking mechanism comprising a flexible shaft, a press hook, and a hook receiver;
   the housing lid comprising a first lid edge and a second lid edge;
   the flexible shaft comprising a fixed shaft end and a free shaft end;
   the first lid edge and the second lid edge being positioned opposite to each other across the housing lid;
   the fixed shaft end being connected onto the housing lid, adjacent to the first lid edge;
   the press hook being connected onto the free shaft end;
   the second lid edge being hingedly connected to the second lengthwise wall;
   the hook receiver being integrated into the first lengthwise wall, adjacent to the receptacle opening; and
   the press hook being engaged with the hook receiver.

16. The reusable snake trap assembly as claimed in claim 10 comprising:
   at least one lid tab;
   at least one receptacle tab;
   the at least one lid tab being peripherally connected to the housing lid;
   the at least one receptacle tab being peripherally connected to the housing receptacle, adjacent to the receptacle opening; and
   the at least one lid tab and the at least one receptacle tab being positioned adjacent to each other.

* * * * *